United States Patent
Pecoraro et al.

(10) Patent No.: US 12,425,191 B1
(45) Date of Patent: Sep. 23, 2025

(54) SYSTEM AND METHOD FOR PROVIDING MULTIPLE KEY ENCRYPTION

(71) Applicant: The Bank of New York Mellon, New York, NY (US)

(72) Inventors: James Pecoraro, New York, NY (US); Scott Ryan James, New York, NY (US); Jakub Guzikowski, Wroclaw (PL); Cezary Siewierski, Dublin (IE); Jason Niggel, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 153 days.

(21) Appl. No.: 18/482,650

(22) Filed: Oct. 6, 2023

(51) Int. Cl.
 *H04L 29/06* (2006.01)
 *H04L 9/08* (2006.01)
 *H04L 9/14* (2006.01)

(52) U.S. Cl.
 CPC .......... *H04L 9/0822* (2013.01); *H04L 9/0877* (2013.01); *H04L 9/0891* (2013.01); *H04L 9/14* (2013.01)

(58) Field of Classification Search
 CPC ... H04L 9/0822; H04L 9/0877; H04L 9/0891; H04L 9/14; H04L 9/3234; G06F 21/602
 See application file for complete search history.

(56) References Cited

U.S. PATENT DOCUMENTS

| | | |
|---|---|---|
| 5,799,086 A | 8/1998 | Sudia |
| 10,903,991 B1 | 1/2021 | Craige et al. |
| 11,201,743 B2 | 12/2021 | Le Saint et al. |
| 11,611,431 B2 | 3/2023 | Bursell et al. |
| 11,671,412 B2 | 6/2023 | Bursell et al. |
| 2001/0050990 A1 | 12/2001 | Sudia |
| 2015/0278531 A1* | 10/2015 | Smith ................. H04L 63/0428 713/165 |
| 2016/0036826 A1* | 2/2016 | Pogorelik ............... G06F 21/10 726/1 |
| 2019/0042706 A1* | 2/2019 | Dewan .................... G06F 21/44 |
| 2019/0318356 A1 | 10/2019 | Martin et al. |

(Continued)

FOREIGN PATENT DOCUMENTS

| | | |
|---|---|---|
| CN | 115001669 A | 9/2022 |
| CN | 115865349 A | 3/2023 |

(Continued)

*Primary Examiner* — Yogesh Paliwal
(74) *Attorney, Agent, or Firm* — Pillsbury Winthrop Shaw Pittman, LLP (57) ABSTRACT

Systems and methods for providing multiple key encryption may generate a private key encryption key (KEK) and a corresponding public KEK in a trusted execution environment (TEE); provide the public KEK to a key generator; generate, by the key generator, a data encryption key (DEK) and encrypt the DEK with the public KEK; obtain, by a key processor, an ephemeral public key and the encrypted DEK, and send the ephemeral public key and the encrypted DEK to the TEE; decrypt, by the TEE, the encrypted DEK using the private KEK, and re-encrypt the decrypted DEK with the ephemeral public key; obtain, by the key processor, the re-encrypted DEK from the TEE and pass the re-encrypted DEK to a signing service; decrypt, by the signing service, the re-encrypted DEK using a corresponding ephemeral private key; and encrypt, by the signing service, data using the DEK.

20 Claims, 3 Drawing Sheets

(56) References Cited

U.S. PATENT DOCUMENTS

| | | | |
|---|---|---|---|
| 2019/0340393 A1* | 11/2019 | Mo | G06F 21/554 |
| 2020/0067907 A1* | 2/2020 | Avetisov | H04L 67/133 |
| 2020/0111080 A1 | 4/2020 | Metcalfe et al. | |
| 2021/0064741 A1* | 3/2021 | Fujiwara | G06F 21/6209 |
| 2021/0173950 A1* | 6/2021 | Kwak | H04L 9/0643 |
| 2021/0234678 A1 | 7/2021 | Armleder | |
| 2022/0029801 A1 | 1/2022 | Velagapalli et al. | |
| 2022/0078028 A1 | 3/2022 | Pettit | |
| 2023/0121852 A1* | 4/2023 | Yan | H04L 9/3268 |
| | | | 713/153 |
| 2023/0126356 A1 | 4/2023 | Peddada et al. | |
| 2024/0388453 A1* | 11/2024 | Zheng | H04L 63/00 |

FOREIGN PATENT DOCUMENTS

| | | |
|---|---|---|
| CN | 115865460 A | 3/2023 |
| JP | 3992491 B2 | 8/2007 |
| WO | 2020/051710 A1 | 3/2020 |
| WO | 2023/080355 A1 | 5/2023 |

* cited by examiner

SYSTEM AND METHOD FOR PROVIDING MULTIPLE KEY ENCRYPTION

CROSS-REFERENCE TO RELATED APPLICATIONS

No cross-reference is presented at this time.

BACKGROUND

Granting access to critical security components like Hardware Security Modules (HSMs), encryption keys, and Secret Management Systems (SMS), to a single application in a Digital Assets Platform may be concerning for several reasons.

Firstly, granting access to critical security components to a single application creates a single point of failure. When all access privileges are concentrated in one application, any security breach or compromise of that application could have severe consequences. If attackers gain access to this single point, they may compromise sensitive keys and data, potentially leading to unauthorized access and theft of digital assets.

Secondly, granting access to a single application may limit redundancy and fault tolerance. Relying solely on one application means that there is no backup mechanism in place. If the application experiences downtime due to maintenance, issues, or cyberattacks, the entire platform's functionality may be disrupted, potentially causing financial losses and reputational damage.

Furthermore, the lack of segregation of duties may be a significant concern. Access control should generally adhere to the principle of least privilege and separate key management from transaction signing responsibilities. Granting a single application high-level privileges blurs these lines, making it challenging to implement security checks and balances. This lack of separation may increase the risk of misuse or unauthorized access, potentially leading to malicious activities.

Lastly, concentrating access in a single application may complicate monitoring and auditing efforts. Effective security monitoring and auditing require granular control and visibility into who accesses sensitive components and when. When access is consolidated, it becomes harder to track and investigate potential security incidents or policy violations.

A signing service is a general process or application that typically accesses key material used to sign transactions that are to be broadcast to a blockchain. This service generally creates and stores the keys to be used on its own and signs transactions that may be confirmed to be authentic. A signing service in a digital assets platform may be responsible for securely generating digital signatures for transactions and cryptographic operations. Its primary function is to take transaction data as input, typically in the form of a hash of the transaction, and then use a private key securely stored within a trusted execution environment (TEE), such as an HSM or another secure enclave, to create a digital signature. This digital signature is a mathematical representation of the transaction data, generated in a way that proves the authenticity and integrity of the transaction.

The signing service is designed to operate within a highly secure environment to protect the private keys from unauthorized access or compromise. It follows strict access control policies and cryptographic best practices to protect the confidentiality and integrity of the private key material. Once a transaction is signed, the signature is attached to the transaction data, and the signed transaction is ready for submission to a blockchain network. This process helps to see that only authorized and authenticated transactions are added to the blockchain, enhancing the security and trustworthiness of the digital assets platform.

However, signing services, in particular, may suffer from the above issues, as they require a very high level of privilege. Efforts to better secure signing service processes are typically focused on better securing the one credential needed to run the service. Other systems require "root" access to run and have access to all key material. Neither of these approaches resolve the issues noted above.

Accordingly, what is needed are systems and methods which enable access to security components to be distributed to minimize the risk of a single point of failure, enhance redundancy, maintain segregation of duties, and facilitate robust monitoring and auditing processes.

SUMMARY

Aspects of the disclosure relate to methods, apparatuses, and/or systems for providing multiple key encryption.

In some aspects, the techniques described herein relate to a method for providing multiple key encryption, including: generating, a private key encryption key (KEK) and a corresponding public KEK in a trusted execution environment (TEE); providing the public KEK to a key generator; generating, by the key generator, a data encryption key (DEK) and encrypting the DEK with the public KEK; obtaining, by a key processor, an ephemeral public key and the encrypted DEK, and sending the ephemeral public key and the encrypted DEK to the TEE; decrypting, by the TEE, the encrypted DEK using the private KEK, and re-encrypting the decrypted DEK with the ephemeral public key; obtaining, by the key processor, the re-encrypted DEK from the TEE and passing the re-encrypted DEK to a signing service; decrypting, by the signing service the re-encrypted DEK using a corresponding ephemeral private key; and encrypting, by the signing service, data using the DEK.

In some aspects, the techniques described herein relate to a method, in which the TEE, is a hardware security module (HSM).

In some aspects, the techniques described herein relate to a method, in which the encrypted DEK is stored in a secret management system (SMS).

In some aspects, the techniques described herein relate to a method, in which the ephemeral public key is obtained from the signing service, and the encrypted DEK is obtained from the SMS.

In some aspects, the techniques described herein relate to a method, in which the signing service resides in a secure enclave.

In some aspects, the techniques described herein relate to a method, further including: obtaining the encrypted data; and decrypting the encrypted data using the DEK.

In some aspects, the techniques described herein relate to a method, further including: sharding, by the key processor, the DEK, into multiple shards, and distributing, the DEK shards to multiple actors.

In some aspects, the techniques described herein relate to a method, in which the multiple actors include at least two actors, each having different credentials.

In some aspects, the techniques described herein relate to a method, in which the data is a transaction request; and in which, the transaction request is broadcast to a blockchain network.

In some aspects, the techniques described herein relate to a system for providing multiple key encryption, implemented by one or more processors, the system including: one or more code sets stored in memory and executed by the one or more processors, which, when executed, configure the one or more processors to: generate a private key encryption key (KEK) and a corresponding public KEK in a trusted execution environment (TEE); provide the public KEK to a key generator; generate, by the key generator, a data encryption key (DEK) and encrypt the DEK with the public KEK; obtain, by a key processor, an ephemeral public key and the encrypted DEK, and send the ephemeral public key and the encrypted DEK to the TEE; decrypt, by the TEE, the encrypted DEK using the private KEK, and re-encrypt the decrypted DEK with the ephemeral public key; obtain, by the key processor, the re-encrypted DEK from the TEE and pass the re-encrypted DEK to a signing service; decrypt, by the signing service the re-encrypted DEK using a corresponding ephemeral private key; and encrypt, by the signing service, data using the DEK.

In some aspects, the techniques described herein relate to a system, in which the TEE, is a hardware security module (HSM).

In some aspects, the techniques described herein relate to a system, in which the encrypted DEK is stored in a secret management system (SMS).

In some aspects, the techniques described herein relate to a system, in which the ephemeral public key is obtained from the signing service, and the encrypted DEK is obtained from the SMS.

In some aspects, the techniques described herein relate to a system, in which the signing service resides in a secure enclave.

In some aspects, the techniques described herein relate to a system, further configured to: obtain the encrypted data; and decrypt the encrypted data using the DEK.

In some aspects, the techniques described herein relate to a system, further configured to: shard, by the key processor, the DEK, into multiple shards, and distribute, the DEK shards to multiple actors.

In some aspects, the techniques described herein relate to a system, in which the multiple actors include at least two actors, each having different credentials.

In some aspects, the techniques described herein relate to a system, in which the data is a transaction request; and in which, the transaction request is broadcast to a blockchain network.

In some aspects, the techniques described herein relate to a non-transitory computer-readable medium storing computer-program instructions that, when executed by one or more processors, cause the one or more processors to effectuate operations including: generating, a private key encryption key (KEK) and a corresponding public KEK in a trusted execution environment (TEE); providing the public KEK to a key generator; generating, by the key generator, a data encryption key (DEK) and encrypting the DEK with the public KEK; obtaining, by a key processor, an ephemeral public key and the encrypted DEK, and sending the ephemeral public key and the encrypted DEK to the TEE; decrypting, by the TEE, the encrypted DEK using the private KEK, and re-encrypting the decrypted DEK with the ephemeral public key; obtaining, by the key processor, the re-encrypted DEK from the TEE and passing the re-encrypted DEK to a signing service; decrypting, by the signing service the re-encrypted DEK using a corresponding ephemeral private key; and encrypting, by the signing service, data using the DEK.

In some aspects, the techniques described herein relate to a non-transitory computer-readable medium, further including: sharding, by the key processor, the DEK, into multiple shards, and distributing, the DEK shards to multiple actors; in which the multiple actors include at least two actors, each having different credentials.

Various other aspects, features, and advantages will be apparent through the detailed description and the drawings attached hereto. It is also to be understood that both the foregoing general description and the following detailed description are illustrative and not restrictive of the scope of the disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

In the following description, for the purposes of explanation, numerous specific details are set forth in order to provide a thorough understanding of the various embodiments. It will be appreciated, however, by those having skill in the art, that the embodiments may be practiced without these specific details, or with an equivalent arrangement. In other cases, well-known structures and devices are shown in block diagram form in order to avoid unnecessarily obscuring the embodiments.

To mitigate the problems described herein, the inventors had to both invent solutions and, in some cases just as importantly, recognize problems overlooked (or not yet foreseen) by others in the field of instruction validation. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The security of the keys used for encryption in a digital assets platform is of paramount importance. In general, a service that signs transactions, e.g., that are to be published to a public blockchain, requires a very high level of privilege. Rather than granting this access to a single application, embodiments provide systems and methods that allow for a finer level of separation of duties, reducing the privilege needed by any one actor. To reduce the risk of unauthorized use of a signing service, embodiments of the process for gaining access to key material may require the cooperation of a number of participants. This creates a separation of duties that may be used to mitigate the risk that a single actor is able to gain unauthorized access.

Accordingly, embodiments provide a signing service, which has been designed to start its process with no access to key material. As explained in detail herein, a separate process, executed by a key processor, may manage the handling of the key material and deliver it to the running service. The second process, the key processor, may be given access to an encrypted copy of the key in which the decryption of this key requires a key stored in a TEE, such as an HSM. In various embodiments, the key processor may be used to deliver entire keys or shards of a key generated, e.g., with standard key sharding techniques. In some embodiments, with each shard created, a new actor may be introduced to the startup procedure. Embodiments described herein are designed to enable better management of key material and a higher level of security. The introduction of the separation of duties may be more consistent with general security practices.

Those with skill in the art will appreciate that inventive concepts described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions. These and other features are described in detail herein with reference to the foregoing figures.

Figure 1:
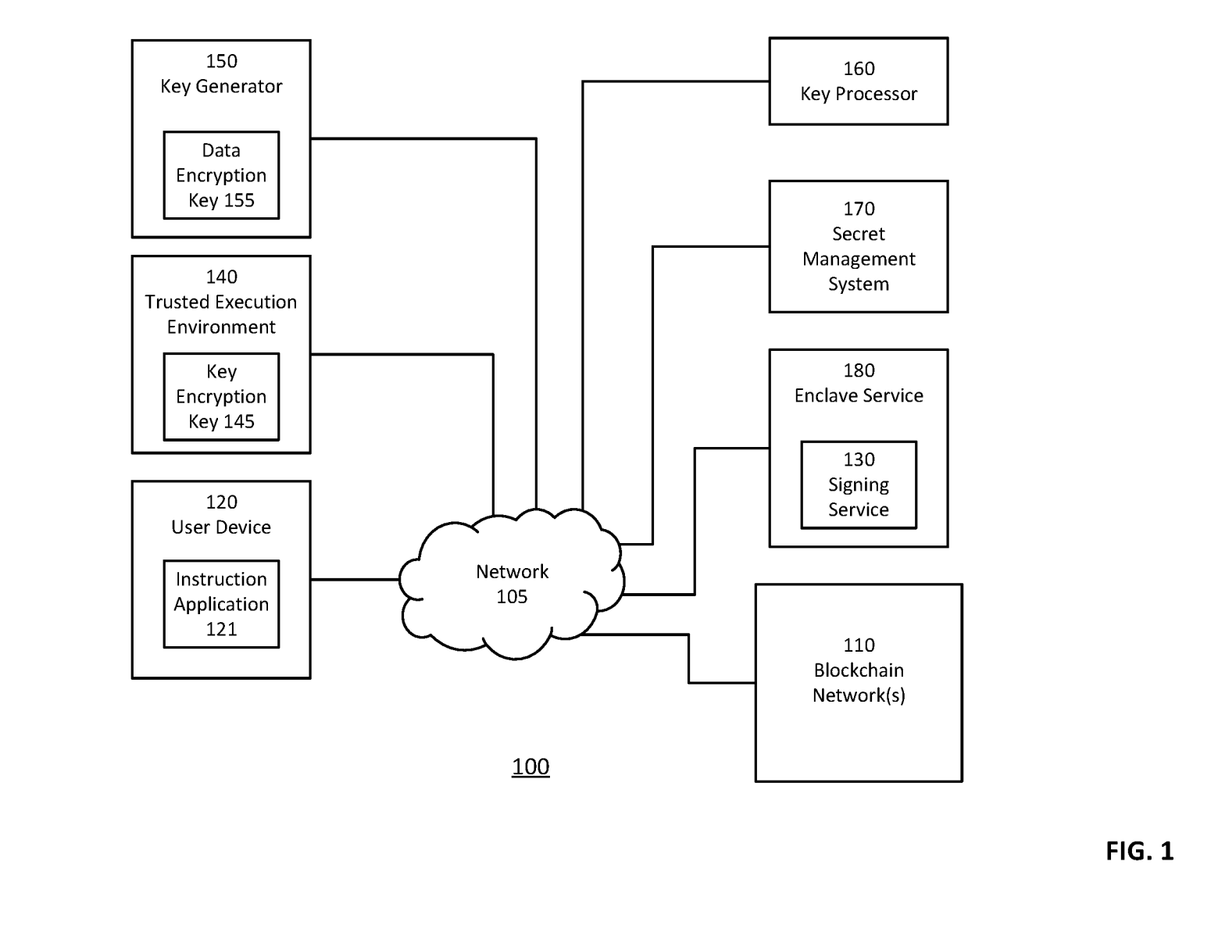
FIG. 1 depicts an illustrative system for providing multiple key encryption, in accordance with at least one embodiment.

FIG. 1 depicts an illustrative system for providing multiple key encryption, in accordance with at least one embodiment. FIG. 1 illustrates a functional block diagram of an embodiment of a multiple key encryption system 100 within which at least some of the disclosed techniques may be implemented. The multiple key encryption system 100 may be established to permit the writing or recording of transactions to a blockchain network 110 via network 105. In some embodiments, multiple key encryption system 100 may constitute at least part of a data management platform or digital assets platform that implements the digital assets instruction processing (or transaction processing) of a request for a change to the blockchain.

In some embodiments, blockchain network 110, may be a public blockchain, which is open and decentralized, accessible to a global user base. In some embodiments, blockchain network 110 may be a private blockchain which is a restricted and centralized network used for specific organizational or consortium-based applications, with an emphasis on privacy and control. Elements of multiple key encryption system 100 may communicate with one or more of the other elements and/or with blockchain network 110 or other entities via the network 105.

In some embodiments, each of the elements of multiple key encryption system 100 may be or may include applications executed on respective computing systems, though this need not always be the case. In some examples, one or more of the applications may be executed on a single computing system (which is not to suggest that such a computing system may not comprise multiple computing devices or nodes, or that each computing device or node need be co-located; indeed, a computing system comprising multiple servers that house multiple computing devices may be operated by a single entity and the multiple servers may be distributed, e.g., geographically). For example, in some embodiments, an entity may execute both a signing service 130 and various other applications on a single computing system or across multiple computing systems of the entity. Moreover, in some examples, the entity may also provide users access to an instruction application 121 on user device 120, which may be a web-based application hosted by a computing system managed by or provisioned by the entity, or which communicates with such a computing system via an application programming interface (API). Accordingly, one or more of the depicted entities may communicate with one another via messages transmitted over network 105, such as the Internet and/or various other local area networks. For example, one or more applications may communicate via messages transmitted over network 105.

In some example embodiments, instruction application 121 may be a client/customer/end user facing application or individual user application with which a user interfaces to manage their account, e.g., data, assets, etc., and/or specify or send instructions, e.g., to execute a transaction or send a communication. While only one instance of an instruction application 121 is shown, embodiments of the multiple key encryption system 100 may include tens, hundreds, thousands, or more such applications accessed by different users on or from their respective computing systems (e.g., user device 120). In some examples, such an application may also, or alternatively, be used internally, such as by an account or fund manager that specifies instructions or transactions, e.g., for a user or within a fund. In some examples, such an application may also, or alternatively, be used by various systems that communicate data requiring encryption and decryption, with or without human intervention. The instruction application 121 and users of the system (e.g., end users and/or internal managers, etc.) may be isolated from accessing some or all of the features and/or information associated with the signing service 130 and/or other system applications, except as described herein.

In some embodiments, instruction application 121 may include a user interface through which a user may interact with multiple key encryption system 100 via user device 120. For example, a user may desire to communicate sensitive data or execute a digital asset transaction. According to embodiments, the user may interact with a user interface of instruction application 121, accessing only the data which a user/user account of the user device 120 is permitted to view, which in turn may send a request or instruction, via an application programming interface (API) associated with a signing service 130, to facilitate a transaction between one user and another user on blockchain network 110.

In some example embodiments, instruction application 121 may access information about securities, such as security prices, from the blockchain network 110 (or from a $3^{rd}$ party), to determine whether to effectuate one or more trades of a security on blockchain network 110, which in some examples may comprise transmitting properties for a transaction to be effectuated on the market. In other example use cases, the instruction application 121 may access information about shipping rates, quantities of assets (e.g., goods) available (e.g., in inventory), costs of assets (e.g., market), among other information by which an instruction regarding a transaction for goods or services may be specified. Additional and/or alternate types of transactions may be used within the scope of this disclosure. The instruction application 121 may store accounting application records indicative of properties of transactions specified by users of the instruction application 121 to be effectuated. An example of such transactions and their associated properties may be for trades (e.g., buying, selling, etc.) of securities on a blockchain network 110 based on security prices.

In some example embodiments, instruction application 121 is an internally facing application by which agents or employees of an entity manage data or assets of the entity. While only one instance of an instruction application 121 is shown, embodiments of the environment 100 may permit multiple agents or employees of an entity implementing instruction application 121 to access respective instances of such an application from their respective computing systems (e.g., respective user devices 120). In some embodiments, each user may be required to provide separate login information and/or other credentials, as described herein. In some examples, instruction application 121 may provide information about assets held by the entity, and transactions corresponding to those assets. Some or all of those transactions may be effectuated by the entity based on properties of transactions specified by users of instruction application 121.

In some embodiments, multiple key encryption system 100 may include signing service 130. In some embodiments, unlike a conventional signing service, signing service 130 may provide a general process that initially has no access to key material used to sign transactions that are to be broadcast to a blockchain, e.g., blockchain network 110. Rather, in some embodiments, signing service 130 may be responsible for fetching or otherwise obtaining a root key in order to implement a cryptographic signature during transaction processing, as described herein. In some embodiments, signing service 130 is not provided credentials for fetching such a key; rather a key is provided via another process, which sends or otherwise provides the key material required by signing service 130 to sign. Accordingly, signing service 130 does not need to run with elevated permissions as it does not need access to fetch any key material on its own, instead leveraging a Trusted Execution Environment (TEE) to protect the key while in memory once received.

For example, in some embodiments, when a user initiates an instruction to execute a transaction, the instruction may be submitted to signing service 130, which initially has no private keys. As explained herein, in some embodiments, a separate process may be executed which may deliver required key material to the signing service 130. As noted herein, this is a paradigm shift from prior systems in which a signing service is configured to generate and store keys used to sign data and/or transaction information. By separating signing service 130 from the key generation and storage process, the level of security may be enhanced, as explained herein.

In some embodiments, multiple key encryption system 100 may include one or more applications or systems which execute or otherwise provide functions which enable signing (e.g., by signing service 130) of data or an instruction to implement a transaction request, without requiring signing service 130 to generate or manage key material. For example, multiple key encryption system 100 may include one or more of trusted execution environment (TEE) 140, key generator 150, key processor 160, secret management system (SMS) 170, and/or enclave service 180, as described herein.

As understood herein, TEE 140 is a secure and isolated environment within a computer system that is designed to protect sensitive data and execute critical operations in a highly secure manner. Its purpose is to enhance the confidentiality, integrity, and authenticity of sensitive computations and data, even in the presence of potentially compromised operating systems or software layers. TEEs achieve this by creating a secure enclave where code and data may be executed and processed without interference from other parts of the system. Non-limiting examples of Trusted Execution Environments (TEEs) include:

Hardware Security Module (HSM): An HSM is a specialized hardware device or appliance that provides a highly secure TEE for cryptographic operations and key management. HSMs are commonly used to store and manage encryption keys, digital certificates, and perform cryptographic operations such as digital signing and encryption in a secure and isolated environment.

Smart Cards: Smart cards, such as EMV cards used in credit and debit transactions, incorporate a TEE to securely store and process sensitive financial information. The TEE within a smart card helps see that transaction data is processed securely and that sensitive data like cardholder information remains confidential.

Mobile Trusted Execution Environment (TEE): Many modern smartphones include a TEE, often referred to as a "secure enclave." This TEE is used for secure biometric authentication (e.g., fingerprint or facial recognition), secure storage of cryptographic keys, and execution of secure mobile payment applications like Apple Pay® and Google Pay®.

Virtualization-Based TEEs: Some virtualization platforms, like Intel SGX® and AMD SEV (Secure Encrypted Virtualization)®, create TEEs within virtual machines. This enables secure execution of virtualized workloads and protects sensitive data from potential breaches in the virtualization layer.

Blockchain Smart Contracts: Some blockchain platforms, like Ethereum®, incorporate TEEs to execute smart contracts. These TEEs facilitate the secure and deterministic execution of the code and data of smart contracts, maintaining the integrity of decentralized applications (DApps) and digital asset transactions.

In each of these examples, the TEE's function is to create a secure and isolated environment where sensitive operations or data may be processed with a high degree of trust and protection from external threats, ensuring the security and integrity of critical functions in various applications. In some embodiments, TEE 140 may be implemented on any computing device that is configured to manage encryption keys without risk of the keys being stolen. For example, the memory that holds the keys may be encrypted such that it cannot be read by other processes running on that same computer.

As explained in detail herein, in some embodiments, TEE 140 may be further configured to generate and/or employ keys to encrypt other keys. For example, in some embodiments, TEE 140 may be configured to generate and/or employ a key encryption key (KEK), such as KEK 145. KEK 145 is a key that is used to encrypt another encryption key. An example implementation of such a KEK occurs when large amounts of data require encryption.

Asymmetric and symmetric keys are cryptographic mechanisms used for securing data, each with its own set of characteristics. Symmetric keys involve a single secret key for both encryption and decryption, offering fast and efficient data protection but requiring secure key distribution. Asymmetric keys, on the other hand, use a pair of public and private keys, allowing for secure communication without the need for key exchange. While asymmetric encryption is slower due to the complex mathematics involved, it excels in secure key distribution and digital signatures. Symmetric keys are best suited for bulk data encryption, while asymmetric keys are often used for securing communications, digital identities, and ensuring trust in a decentralized manner.

Both key types have their strengths and are frequently used in combination to achieve a balance between efficiency and security in cryptographic applications. Asymmetric (or Public/Private) keys are used to encrypt a small amount of data (e.g., data the size of the key itself, typically 256 bytes). When needing to encrypt a large amount of data, it is common to encrypt the data with a symmetric key, such as data encryption key (DEK) 155, and then encrypt the symmetric key with an asymmetric key, such as KEK 145. This gives the advantages of a public/private setup but also enables efficient encryption of a large amount of data. By way of example, Advanced Encryption Standard (AES) is a common symmetric key which may be encrypted with an RSA asymmetric key. The RSA key is an example of a KEK. In some example embodiments, a first asymmetric key may be encrypted with a second asymmetric key to increase security, as described herein.

In some embodiments, a resulting encrypted DEK may be stored in a secret management system (SMS), such as SMS 170. As understood herein, an SMS, also known as a key management system (KMS) or a Secrets Manager, is a specialized tool or service designed to securely generate, store, distribute, and/or manage cryptographic keys, secrets, and other sensitive credentials used in various applications and systems. In some embodiments, a purpose of implementing an SMS is to enhance security by centralizing and automating the management of keys and secrets while implementing robust access controls and audit trails.

As understood herein, key generator 150 is an application designed to create and prepare cryptographic keys, including both symmetric and asymmetric keys, for secure storage and usage. In certain security-sensitive scenarios, such as in the case of asymmetric keys, the generator may produce a private key along with its corresponding public key. The private key is kept confidential, while the public key may be freely shared. In some embodiments, key generator 150 may be, or may be part of, a secure enclave, such as an enclave server. In some embodiments, key generator 150 may be configured to generate and hold the root key to be encrypted with the Public KEK. Accordingly, in some embodiments, key generator 150 may require additional protection (e.g., as its own enclave) until the key is encrypted and the process exits (e.g., memory is destroyed). In some embodiments, that encrypted root key may then be stored in the SMS, e.g., as described herein.

In some embodiments, multiple key encryption system 100 may further include and/or implement a key processor application, such as key processor 160. As understood here, a function of key processor 160 is to decrypt keys (and/or key shards) and re-encrypt them for sending to other services, e.g., signing service 130, as explained in further detail herein. In some embodiments, key processor 160 may employ an ephemeral key pair, e.g., from an enclave such as enclave service 180, to re-encrypt keys that are to be distributed to various applications or services. Ephemeral keys may be particularly valuable in scenarios where forward secrecy is important. Forward secrecy protects against an attacker who gains access to long-term keys at some point in the future, being able to decrypt past sessions encrypted with ephemeral keys. Overall, ephemeral keys may enhance the security of encrypted communications by limiting the exposure of keys and reducing the risk of compromise.

In some embodiments, multiple key encryption system 100 may include enclave service 180, which, in some embodiments, may host or otherwise include signing service 130. In some embodiments, signing service 130 may generate or otherwise provide ephemeral keys as needed. An enclave is a secure and isolated computational environment within a larger computing system, typically facilitated by hardware or software-based security mechanisms. Enclaves are designed to protect sensitive data and code by isolating them from the rest of the system, preventing unauthorized access and tampering. This isolation assists with the operations and data within the enclave remaining confidential, maintain their integrity, and are shielded from external threats, even when the host system or its software components may be compromised. Enclaves are commonly used in modern computing for secure execution of critical applications, cryptographic operations, and the protection of sensitive data, making them integral to enhancing overall system security. It should be noted that while enclave service 180 is shown in FIG. 1 as being a standalone enclave, in some embodiments, enclave service 180 may be part of, associated with, and/or the same as TEE 140.

Given an encrypted root key stored in a secrets management system, a Hardware Security Module (HSM) which holds the Key Encryption Key used to decrypt the encrypted Root Key, signing service, leveraging a TEE, capable of generating an Ephemeral Key, and employing various elements of multiple key encryption system 100 described herein, various embodiments may be configure to, among other functions:

A) Fetch an ephemeral public key from the signing service (e.g., the signing service holding the corresponding private key in the TEE);
B) Fetch the encrypted root key (e.g., the DEK) from the SMS;
C) Send the ephemeral public key and encrypted root key to the HSM, which may decrypt the root key and re-encrypt the key with the ephemeral public key;
D) Send the re-encrypted key to the signing service; and
E) employ the signing service to decrypt the re-encrypted key with the ephemeral private key, to enable signing by the signing service.

Figure 2:
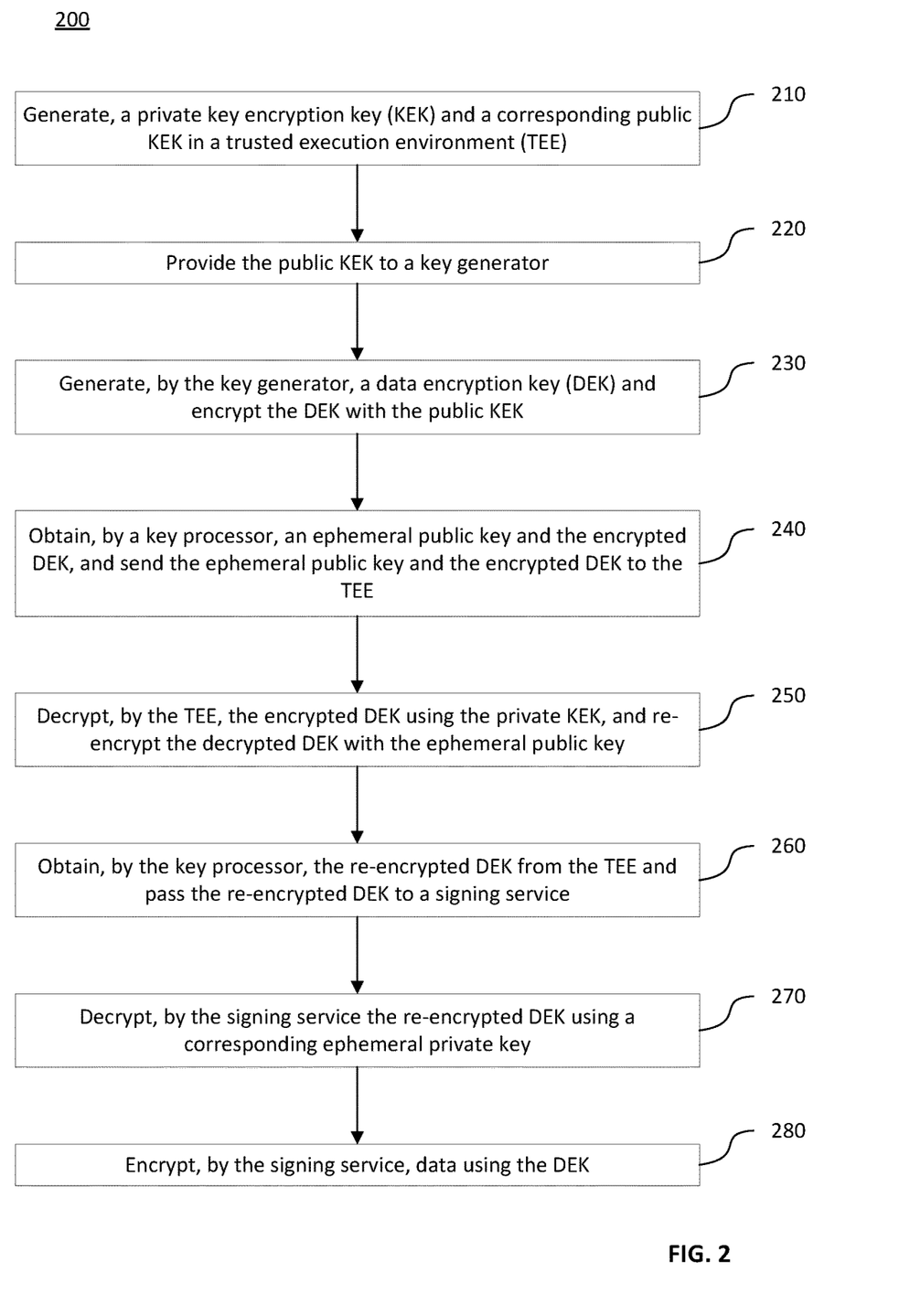
FIG. 2 depicts an example method for providing multiple key encryption, in accordance with at least one embodiment.

These and other features of multiple key encryption system 100 will be further understood with reference to the instruction validation method 200 of FIG. 2, herein.

FIG. 2 depicts an example method for providing multiple key encryption, in accordance with at least one embodiment. In various embodiments, method 200 may be implemented by system 100, executing code in one or more processors therein. For example, in some embodiments, method 200 may be performed on a computer (e.g., computer system 1000 of FIG. 3) having one or more processors (e.g., processor(s) 1010 of FIG. 3) and memory (e.g., system memory 1020 of FIG. 3), and one or more code sets, applications, programs, modules, and/or other software stored in the memory and executing in or executed by one or more of the processor(s).

Method 200 begins at step 210 when a processor (e.g., of a data management platform or a digital assets platform) receives an instruction for a signing service (such as, for example, signing service 130) to execute a digital signature, e.g., via multiple key encryption system 100. For example, in some embodiments, a user may initiate a transaction request to execute a transaction and publish it to a blockchain (e.g., blockchain network 110), may request that certain data be encrypted, or may initiate any other request requiring a digital signature. For example, in some embodiments, an instruction may be received from an end user, e.g., a client of a company or institution. In other embodiments, an instruction may be received from an account or fund manager or other agent that specifies instructions or transactions, e.g., for a user or within a fund. In some embodiments, an instruction to implement a transaction request may include, for example, details such as the sender's address, recipient's address, transaction amount, and/or any optional data or metadata associated with the transaction.

In some embodiments, once a request is received, the processor may be configured to generate a private key encryption key and a corresponding public key encryption key in a trusted execution environment. As noted above, unlike conventional signing services, the signing service according to embodiments starts with no access to key material; a separate process manages the handling of the key material and delivers it to the signing service, as described herein. Accordingly, in some embodiments, the processor may send a request to the TEE to generate a public/private key encryption key pair, e.g., a cryptographic key whose purpose is to be used to encrypt another key, e.g., a symmetric key or another asymmetric key.

A Trusted Execution Environment (TEE) is a secure and isolated environment within a computing system that helps provide confidentiality and integrity of sensitive data and operations, even in potentially compromised software or hardware environments. TEEs provide a secure enclave where code and data may be executed separately from the rest of the system, safeguarding against unauthorized access and tampering. In some embodiments, the TEE may be an HSM. An HSM, or Hardware Security Module, is a specialized and tamper-resistant hardware device designed to securely store and manage cryptographic keys and perform cryptographic operations. HSMs are used to enhance the security of sensitive data by ensuring that keys are protected from physical attacks and unauthorized access. They are commonly employed in applications requiring high levels of security, such as secure communications, digital signatures, and data encryption.

At step 220, in some embodiments, the TEE may be configured to provide the public KEK to a key generator, e.g., key generator 150. It should be noted that, in some embodiments, the TEE may retain the private KEK for later use, as described herein. Next, in some embodiments, at step 230, key generator 150 may be configured or otherwise programmed to generate a key, e.g., a data encryption key (DEK 155). In some embodiments, the purpose of the DEK is for encryption of data. However, at this stage, key generator may be configured to encrypt the DEK with the public KEK received from the TEE. By encrypting the DEK with an asymmetric key, such as public KEK 145, the DEK may then be sent or otherwise transmitted, e.g., to other applications or systems for further use without concern of exposure of the DEK. This gives the advantages of a public/private setup but may also enable efficient encryption of a large amount of data with the DEK, when needed.

In some embodiments, only an application with access to the corresponding private KEK may be able to decrypt the encrypted DEK, as described herein. Furthermore, in some embodiments, the encrypted DEK may be stored in a secret management system (SMS) for future use. In some embodiments, encrypted keys may be stored in an SMS to add an extra layer of security and/or to centrally manage and protect cryptographic keys. When keys such as the DEK are encrypted and stored in an SMS, in some embodiments, they are shielded from unauthorized access and may only be decrypted by authorized users or applications with the proper permissions. This enhances key security, enforces access controls, enables key rotation, and facilitates secure key distribution, thus enhancing data protection.

At step 240, in some embodiments, a key processor, e.g., key processor 160, may be configured to fetch or otherwise obtain an ephemeral public key and the encrypted DEK, and send both the ephemeral public key and the encrypted DEK to the TEE. Ephemeral keys provide short-lived, temporary cryptographic key pairs for secure communication sessions or transactions. These keys enhance security by minimizing the exposure of long-term keys, reducing the risk of key compromise, and enabling forward secrecy, helping to see that past communications remain confidential even if long-term keys are compromised in the future. Ephemeral keys enhance security for real-time encryption and are commonly used in secure messaging, web browsing, and other applications where data privacy and confidentiality are paramount.

Ephemeral keys are typically generated using secure random number generators (RNGs) to create a new and random key pair for each session or transaction. For asymmetric cryptography, like Diffie-Hellman key exchange, ephemeral private and public keys are generated for each session or transaction. For symmetric cryptography, a new symmetric key is generated for each session. These keys are typically generated using a combination of entropy sources, such as hardware-based randomness or system-generated entropy, to help facilitate unpredictability and security. The ephemeral keys are used only for a short period, enhancing security by reducing the exposure of long-term cryptographic keys.

In some embodiments, an ephemeral public key may be fetched or otherwise obtained by the key processor from the signing service. As noted herein, in some embodiments, signing service 130 may be configured to generate or otherwise manage one or more sets of ephemeral public/private key pairs. Accordingly, in some embodiments, key processor 160 may be configured to request, fetch, or otherwise obtain an ephemeral public key from signing service 130, while 130 may retain the corresponding ephemeral private key for future use, e.g., decryption. Additionally, in some embodiments, key processor 160 may be configured to request, fetch, or otherwise obtain the encrypted DEK, e.g., from SMS 170 (e.g., if the encrypted DEK was previously stored in the SMS). In some embodiments, both the ephemeral public key and the encrypted DEK may then be transmitted to or otherwise obtained by the TEE for further processing.

At step 250, in some embodiments, the TEE may be configured to decrypt the encrypted DEK using the private KEK (e.g., the corresponding key to the public KEK used to encrypt the DEK), and re-encrypt the now-decrypted DEK with the ephemeral public key it received from signing service 130. Re-encryption by the TEE of the DEK with the ephemeral public key helps enable signing service 130, which retained the corresponding ephemeral private key, to decrypt the re-encrypted DEK, once received.

It should be noted that, while embodiments describe employing ephemeral keys, in other embodiments standard asymmetric key pairs may be implemented. Ephemeral keys, while offering enhanced security benefits, may require balancing other considerations, depending on the embodiment. Managing short-lived keys may introduce overhead, especially in high-volume scenarios, as key generation and distribution need efficient handling. Additionally, in asymmetric cryptography, exchanging ephemeral public keys during key establishment may consume bandwidth and computational resources. Furthermore, managing the confidentiality of past sessions even if long-term keys are compromised requires careful key management and storage. Accordingly, in various embodiments, standard asymmetric key pairs may be implemented, e.g., in place of and/or in addition to ephemeral keys.

Next, at step 260, in some embodiments, a key processor, such as key processor 160, may be configured to fetch or otherwise obtain the re-encrypted DEK from the TEE and pass the re-encrypted DEK to a signing service, e.g., signing service 130. Because the DEK has been re-encrypted with the ephemeral public key, this reduces the risk that the DEK could be improperly accessed. In some embodiments, signing service 130 may reside in otherwise be part of a secure enclave, such as enclave service 180. In some embodiments, having a signing service reside inside a secure enclave may enhance security and trustworthiness of the overall system. Secure enclaves provide a protected and isolated environment within a computing system, helping to shield the signing service's operations, including the signing of cryptographic transactions or messages, from potential threats, even if the host system or its software layers are compromised. This isolation may significantly reduce the risk of unauthorized access, tampering, or key exposure, ultimately bolstering the integrity and confidentiality of the signing process and the digital assets it secures.

At step 270, in some embodiments, the signing service, e.g., signing service 130, may be configured to decrypt the re-encrypted DEK using a corresponding ephemeral private key. In some embodiments, having retained the ephemeral private key which corresponds to the ephemeral public key used to re-encrypt the DEK, the signing service has the proper credentials to decrypt the DEK, and access the DEK. At this point, the signing service which previously had not key materials for executing its signing function now has a DEK which was securely transferred to it.

Finally, at step 280, in some embodiments, the signing service, e.g., signing service 130, may be configured to use the newly acquired (and decrypted) DEK to, e.g., encrypt data or otherwise execute signing functions. This may include, for example, data stored in separate (e.g., remote) databases, or data integrated into other cryptographic solutions such as smart contracts or oracles. Likewise, signing service 130 may be configured to retrieve such data and decrypt or sign it, e.g., using the DEK.

In some embodiments, the signing service may be configured to use the newly acquired key to, e.g., sign a transaction request. Once signed, the transaction request may be broadcast, e.g., to the blockchain network, and/or multiple key encryption system 100 may be configured to execute subsequent steps in a transaction process, depending on the specific use case. Ultimately, the signed transaction request may be written to a blockchain ledger.

It should be noted that while embodiments described herein refer to a single DEK, in some embodiments, to further enhance key security, especially for sensitive data, the DEK (or any other key) may undergo a process known as sharding. Sharding involves dividing a key into multiple smaller fragments or shards. Each shard is essentially a portion of the original key, and this fragmentation adds an extra layer of security. After sharding, the key generator or key processor may proceed to encrypt each individual shard, e.g., using strong cryptographic algorithms using the KEK or multiple different KEKs. In some embodiments, each shard may be provided to a separate actor, e.g., each actor or each level of actor having separate credentials for shards. In some embodiments, an actor may be a user, system, subsystem, or application. In various embodiments, any combination of actors may be provided with a separate shard, depending on the use case. Accordingly, if one shard were to be compromised, it would be useless without the other shards and the appropriate decryption process, significantly bolstering the overall security of the key. In some embodiments, these prepared keys may then be securely stored, often in hardware security modules (HSMs) or other secure storage solutions, to prevent unauthorized access and safeguard critical cryptographic operations. In some embodiments, once the key processor delivers all shards of a key, the signing service may be configured to reconfigure the key into a sign key that may then be used for encryption or signing.

Embodiments enable running the signing service with a lower privilege level to reduce the attack surface. Furthermore, the signing service, which may now run continuously, does not have the credentials to access the SMS or HSM, for example, making it more secure. Additionally, embodiments support a separation of duties as each of the 'n' key shards may be delivered by processes with different credentials.

Figure 3:
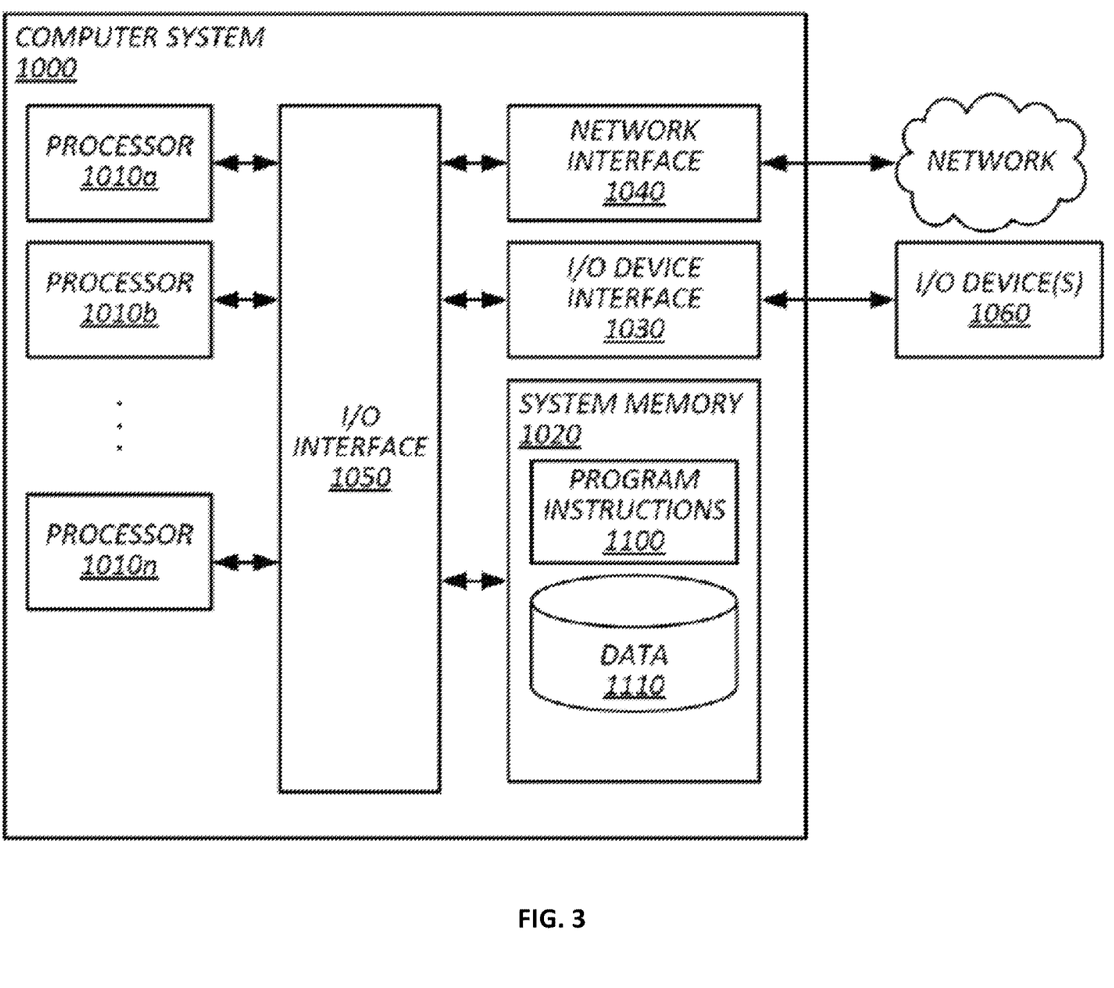
FIG. 3 depicts an example computer system on which systems and methods described herein may be executed, in accordance with at least one embodiment.

Some embodiments may execute the above operations on a computer system, such as the computer system of FIG. 3, which is a diagram that illustrates a computing system 1000 in accordance with embodiments of the present techniques. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, external (e.g., third party) content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B may include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

While the systems and methods described herein have generally be described with respect to a single legacy language being translated to a modernized coding language (e.g., one-to-one translation of a first language to a second language), in various embodiments, the same processes may be implemented in a one-to-many framework. For example, in some embodiments, a user may indicate one or more second languages to which a first language is to be translated. Additionally or alternatively, in some embodiments, one or more translation recommendations may be provided (as described herein) for multiple translations. In either event, embodiments of the systems and methods described herein may be configured to process multiple translations, e.g., in parallel and/or in series (e.g., based on an identified priority), as described herein.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for providing multiple key encryption, comprising:
    generating, a private key encryption key (KEK) and a corresponding public KEK in a trusted execution environment (TEE);
    providing the public KEK to a key generator;
    generating, by the key generator, a data encryption key (DEK) and encrypting the DEK with the public KEK;
    obtaining, by a key processor, an ephemeral public key and the encrypted DEK, and sending the ephemeral public key and the encrypted DEK to the TEE;
    decrypting, by the TEE, the encrypted DEK using the private KEK, and re-encrypting the decrypted DEK with the ephemeral public key;
    obtaining, by the key processor, the re-encrypted DEK from the TEE and passing the re-encrypted DEK to a signing service;
    decrypting, by the signing service the re-encrypted DEK using a corresponding ephemeral private key; and
    encrypting, by the signing service, data using the DEK.

2. The method of claim 1, wherein the TEE, is a hardware security module (HSM).

3. The method of claim 1, wherein the encrypted DEK is stored in a secret management system (SMS).

4. The method of claim 3, wherein the ephemeral public key is obtained from the signing service, and the encrypted DEK is obtained from the SMS.

5. The method of claim 1, wherein the signing service resides in a secure enclave.

6. The method of claim 1, further comprising:
obtaining the encrypted data; and
decrypting the encrypted data using the DEK.

7. The method of claim 1, further comprising:
sharding, by the key processor, the DEK, into multiple shards, and
distributing, the DEK shards to multiple actors.

8. The method of claim 7, wherein the multiple actors comprise at least two actors, each having different credentials.

9. The method of claim 1, wherein the data is a transaction request; and
wherein, the transaction request is broadcast to a blockchain network.

10. A system for providing multiple key encryption, comprising:
one or more processors; and
at least one memory storing one or more code sets in the at least one memory and executed by the one or more processors, which, when executed, configure the one or more processors to:
generate a private key encryption key (KEK) and a corresponding public KEK in a trusted execution environment (TEE);
provide the public KEK to a key generator;
generate, by the key generator, a data encryption key (DEK) and encrypt the DEK with the public KEK;
obtain, by a key processor, an ephemeral public key and the encrypted DEK, and send the ephemeral public key and the encrypted DEK to the TEE;
decrypt, by the TEE, the encrypted DEK using the private KEK, and re-encrypt the decrypted DEK with the ephemeral public key;
obtain, by the key processor, the re-encrypted DEK from the TEE and pass the re-encrypted DEK to a signing service;
decrypt, by the signing service the re-encrypted DEK using a corresponding ephemeral private key; and
encrypt, by the signing service, data using the DEK.

11. The system of claim 10, wherein the TEE, is a hardware security module (HSM).

12. The system of claim 10, wherein the encrypted DEK is stored in a secret management system (SMS).

13. The system of claim 12, wherein the ephemeral public key is obtained from the signing service, and the encrypted DEK is obtained from the SMS.

14. The system of claim 10, wherein the signing service resides in a secure enclave.

15. The system of claim 10, further configured to:
obtain the encrypted data; and
decrypt the encrypted data using the DEK.

16. The system of claim 10, further configured to:
shard, by the key processor, the DEK, into multiple shards, and
distribute, the DEK shards to multiple actors.

17. The system of claim 16, wherein the multiple actors comprise at least two actors, each having different credentials.

18. The system of claim 10, wherein the data is a transaction request; and
wherein, the transaction request is broadcast to a blockchain network.

19. A non-transitory computer-readable medium storing computer-program instructions that, when executed by one or more processors, cause the one or more processors to effectuate operations comprising:
generating, a private key encryption key (KEK) and a corresponding public KEK in a trusted execution environment (TEE);
providing the public KEK to a key generator;
generating, by the key generator, a data encryption key (DEK) and encrypting the DEK with the public KEK;
obtaining, by a key processor, an ephemeral public key and the encrypted DEK, and sending the ephemeral public key and the encrypted DEK to the TEE;
decrypting, by the TEE, the encrypted DEK using the private KEK, and re-encrypting the decrypted DEK with the ephemeral public key;
obtaining, by the key processor, the re-encrypted DEK from the TEE and passing the re-encrypted DEK to a signing service;
decrypting, by the signing service the re-encrypted DEK using a corresponding ephemeral private key; and
encrypting, by the signing service, data using the DEK.

20. The non-transitory computer-readable medium of claim 19, further comprising:
sharding, by the key processor, the DEK, into multiple shards, and
distributing, the DEK shards to multiple actors;
wherein the multiple actors comprise at least two actors, each having different credentials.

* * * * *